(12) United States Patent
Parmar

(10) Patent No.: US 12,253,479 B1
(45) Date of Patent: Mar. 18, 2025

(54) SPACE-BASED X-RAY IMAGING SYSTEM

(71) Applicant: Jaywant Philip Parmar, Lacey, WA (US)

(72) Inventor: Jaywant Philip Parmar, Lacey, WA (US)

( * ) Notice: Subject to any disclaimer, the term of this patent is extended or adjusted under 35 U.S.C. 154(b) by 446 days.

(21) Appl. No.: 17/849,647

(22) Filed: Jun. 26, 2022

Related U.S. Application Data

(60) Provisional application No. 63/287,075, filed on Dec. 8, 2021.

(51) Int. Cl.
*G01N 23/04* (2018.01)
*G21F 3/00* (2006.01)

(52) U.S. Cl.
CPC ............. *G01N 23/04* (2013.01); *G21F 3/00* (2013.01)

(58) Field of Classification Search
None
See application file for complete search history.

(56) References Cited

U.S. PATENT DOCUMENTS

| | | | | |
|---|---|---|---|---|
| 5,355,399 | A * | 10/1994 | Golovanivsky | A61L 2/082 378/119 |
| 6,327,338 | B1 * | 12/2001 | Golovanivsky | H05G 2/003 378/119 |
| 7,166,825 | B1 * | 1/2007 | Smith | G01N 21/274 250/203.4 |
| 7,365,336 | B1 * | 4/2008 | Galica | G01T 1/362 250/361 R |
| 7,529,343 | B2 * | 5/2009 | Safai | H01J 35/10 378/86 |
| 7,868,665 | B2 * | 1/2011 | Tumer | H03F 3/45475 327/51 |
| 8,067,738 | B1 * | 11/2011 | Heath | G01J 3/36 250/338.1 |
| 8,083,407 | B2 * | 12/2011 | Attina | G02B 7/22 378/158 |
| 8,519,335 | B2 * | 8/2013 | Fischbach | G01T 1/1606 250/336.1 |
| 8,642,960 | B2 * | 2/2014 | Fischbach | G01T 7/00 250/336.1 |
| 9,335,420 | B2 * | 5/2016 | Fischbach | G01T 7/00 |
| 9,666,403 | B2 * | 5/2017 | Dondokovich Dugar-Zhabon | H01J 35/13 |
| 11,860,292 | B2 * | 1/2024 | Eberspach | G01S 7/4816 |
| 2004/0017224 | A1 * | 1/2004 | Tumer | H04N 25/773 327/51 |

(Continued)

*Primary Examiner* — Marcus H Taningco
*Assistant Examiner* — Djura Malevic
(74) *Attorney, Agent, or Firm* — Michael D. Eisenberg

(57) ABSTRACT

A space-based x-ray imaging system comprising a spacecraft frame, a shutter apparatus, and a detector. The frame comprises: radiation shielding for shielding an inner cavity from solar radiation; and an input window opening on a section of the radiation shielding to enable passage of the solar radiation into the inner cavity. The shutter apparatus is near the input window and configured to be selectively opened and closed, to selectively enable and prevent passage of the solar radiation into the inner cavity via the input window. The detector is in the inner cavity and aligned with the input window, such that the detector is impinged by the solar radiation passing through the input window, such that an x-ray flux from the solar radiation is usable for x-ray imaging of a target located between the detector and the input window.

25 Claims, 12 Drawing Sheets

(56) References Cited

U.S. PATENT DOCUMENTS

| | | | | |
|---|---|---|---|---|
| 2004/0101108 A1* | 5/2004 | Charleton | ............... | G01N 23/04 |
| | | | | 378/198 |
| 2006/0055400 A1* | 3/2006 | Safai | ...................... | G01N 23/04 |
| | | | | 324/232 |
| 2009/0090869 A1* | 4/2009 | Fischbach | ............. | G01T 1/1606 |
| | | | | 340/600 |
| 2009/0310738 A1* | 12/2009 | Tischenko | ............ | G01T 1/2985 |
| | | | | 378/10 |
| 2011/0062335 A1* | 3/2011 | Franklin | ................ | G02B 27/58 |
| | | | | 250/336.1 |
| 2012/0057174 A1* | 3/2012 | Briggs | .................... | G01S 17/89 |
| | | | | 356/603 |
| 2012/0305788 A1* | 12/2012 | Fischbach | ............. | G01T 1/1606 |
| | | | | 250/336.1 |
| 2013/0006449 A1* | 1/2013 | Hindman | ............... | B64G 1/361 |
| | | | | 701/13 |
| 2013/0044248 A1* | 2/2013 | Tumer | ................ | H03F 3/45475 |
| | | | | 348/E5.091 |
| 2013/0316487 A1* | 11/2013 | de Graff | ............ | A61B 1/04 |
| | | | | 438/66 |
| 2014/0361188 A1* | 12/2014 | Fischbach | ................ | G01T 7/00 |
| | | | | 250/393 |
| 2016/0195622 A1* | 7/2016 | Fischbach | ................ | G01T 1/20 |
| | | | | 250/336.1 |
| 2017/0315067 A1* | 11/2017 | Mandrake | ............ | G01N 23/203 |
| 2022/0037104 A1* | 2/2022 | Rameau | ................ | H01J 1/3044 |
| 2022/0185508 A1* | 6/2022 | Lairson | .................... | B64G 1/66 |

* cited by examiner

SPACE-BASED X-RAY IMAGING SYSTEM

CROSS-REFERENCES TO RELATED APPLICATIONS

This application claims priority from U.S. Provisional Application Ser. No. 63/287,075 filed Dec. 8, 2021, which is hereby incorporated herein by reference in the respective in its entirety.

TECHNICAL FIELD

This present invention, in some embodiments thereof, relates to x-ray medical imaging systems, such as (but not limited to) projectional radiography, computerized tomography, and fluoroscopy.

BACKGROUND OF THE INVENTION

Important medical imaging techniques, such as projectional radiography, computerized tomography, and fluoroscopy, make use of x-rays. The production of x-rays requires extremely heavy, fragile, and dangerous components, such as vacuum tubes surrounded by liquid Mercury cooling jackets which are fragile and if broken could lead to deadly chemical spills. The arrangement of such components has been perfected on fixed locations, to minimize breakage, unwanted production of radiation outside the desired locations proximal to the target of the imaging, and chemical spillages.

However, setting up an x-ray imaging system is space (such as low Earth orbit and beyond) presents a challenge. First, because of the size and fragility of these components of an x-ray imaging system, carrying such components to space would be expensive and may damage the components. Furthermore, setting up such components in space would require precision that would be difficult to achieve in micro gravity conditions.

BRIEF SUMMARY OF EMBODIMENTS OF THE INVENTION

In view of the above, it would be desirable create x-ray imaging in space without adding the complication of carrying components responsible for x-ray production to space.

The solar corona is believed to be the source of most or all of the solar x-ray flux, including "hard x-ray" energies about the 120 keV regime, which are ideal for diagnostic radiographic medical imaging. Moreover, the sun ejects particles/radiation (commonly known as "solar ejected particle" or "SEPs") of energies higher than x-rays, such as SEPs alpha particles, beta particles, Muons, Neutrinos, Quarks, etc.

An aim of the present invention is to utilize solar radiation as a source of x-rays for imaging in space. The use of solar radiation includes receiving the hard x-ray flux from she solar corona for use in imaging applications. In some embodiment of the present invention SEPs are converted into imaging photons as well, since the production of x-rays in the solar corona is highly variable.

Generally, in radiography two critical features of the x-ray flux are considered: Kilovolt Peak (kVp) and milliampereseconds (mAs). When using the sun as an x-ray generator, these features are continuously and widely variable based on the chaotic solar coronal physics and the SEP emission physics (from the solar core). Thus, it is an aim of the present invention to control the kVp and mAs of the solar radiation reaching the target via control of the exposure of the target to the solar radiation.

Therefore, an aspect of some embodiments of the present invention relates to a space-based x-ray imaging system comprising a spacecraft frame, a shutter apparatus, and a detector. The spacecraft frame has an inner cavity and comprises: radiation shielding for shielding the inner cavity from solar radiation; and an input window opening on a section of the radiation shielding and configured to enable passage of the solar radiation therethrough into the inner cavity. The shutter apparatus is disposed near the input window and configured to be controlled to selectively open and close, such that in an open mode of the shutter apparatus, passage of the solar radiation into the inner cavity via the input window is enabled, and in a closed mode of the shutter apparatus, passage of the solar radiation into the inner cavity via the input window is blocked. The detector is located in the inner cavity and aligned with the input window, such that the detector is impinged by the solar radiation passing through the input window, such that an x-ray flux from the solar radiation is usable for x-ray imaging of a target located between the detector and the input window.

In some embodiments of the present invention, the space-based x-ray imaging system further comprises a Bremsstrahlung cascade apparatus configured to interact with a portion of the solar radiation having an energy higher than a desired imaging regime and to convert the portion of the solar radiation into imaging photons in the desired imaging regime.

In a variant, the desired imaging regime is 80-140 keV.

In another variant, the Bremsstrahlung cascade apparatus comprises a metal plate covering at least part of the input window and configured to decelerate the portion of the solar radiation, to generate the imaging photons in the desired imaging regime.

The metal plate may comprise a lead plate.

In yet another variant, the Bremsstrahlung cascade apparatus comprises a transparent window having two separate panes and at least one noble gas between the panes, the at least one noble gas being configured to interact with the portion of the solar radiation passing therethrough, to generate the imaging photons in the desired imaging regime.

The Bremsstrahlung cascade apparatus may be part of the input window.

In some embodiments of the present invention, the Bremsstrahlung cascade apparatus comprises a plurality polycapillary tubes having first ends facing outward from the spacecraft frame and second ends facing the cavity, the polycapillary tubes having diameters on an order of magnitude of one or more wavelengths corresponding to one or more predetermined types of radiation in the portion solar radiation, such that the polycapillary tubes only receive the predetermined types of radiation and filter out radiation with a wavelength different than the predetermined one of more wavelengths. Each polycapillary tube comprise a core radially surrounded by a cladding sheath comprising a metal, the core being transparent to the one or more predetermined types of solar radiation. At least one of the polycapillary tubes comprises one or more atoms or molecules in the respective core, configured to generate the imaging photons in the desired imaging regime via interaction with the one or more predetermined types of radiation.

In a variant, at least one of the polycapillary tubes comprises a plurality of segments disposed serially in line. Each one of the segments is configured to receive radiation output from a preceding one of the segments and partially weaken the received radiation via interaction therewith, such that a last one of the segments is configured to generate radiation in the desired imaging range.

In another variant, the Bremsstrahlung cascade apparatus is part of the input window In a variant, the shutter apparatus is disposed in the inner cavity.

In another variant, the shutter apparatus is disposed outside the inner cavity.

In yet another variant, the input window is rectangular.

In a further variant, the input window is square.

In some embodiments of the present invention, the space-based x-ray imaging system comprises a control unit configured to receive data indicative at least one characteristic of the x-ray flux and to control the shutter apparatus, such that the shutter apparatus is in the closed mode when the at least one characteristic is outside a desired range and such that the shutter apparatus is in the open mode when the at least one characteristic is within the desired range.

In a variant, the space-based x-ray imaging system comprises at least one sensor configured to measure the at least one characteristic of the x-ray flux and generate the data indicative at least one characteristic of the x-ray flux. The at least one sensor is configured to communicate with the control unit and to transmit the data thereto.

In another variant, the detector is configured measure the at least one characteristic of the x-ray flux and generate the data indicative at least one characteristic of the x-ray flux. The detector is configured to communicate with the control unit and to transmit the data thereto.

In yet another variant, the control unit is configured to communicate with a solar weather monitoring system and to receive from a solar weather monitoring system solar weather data, the control unit being configured to close the shutter apparatus when the solar weather data indicates an undesirable condition in the solar weather.

In a further variant, the shutter apparatus comprises an iris, configured to be controlled to selectively open and close and to control a cross section through which the solar radiation passes into the inner cavity.

In yet a further variant, the detector is configured to generate data indicative of at least one characteristic of the radiation impinging the detector. The space-based x-ray imaging system comprises a control unit configured to receive the data from the detector and to control an operation of the iris, to control the cross section such that the at least one characteristic is within a desired range.

In a variant, the space-based x-ray imaging system is configured as a projectional radiography system, wherein the detector comprises a digital radiography plate configured to detect an incident flux of x-ray energies of the x-ray flux and to create a two-dimensional image of the target.

In another variant, the space-based x-ray imaging system is configured as a computerized tomography (CT) system, wherein the detector comprises one or more CT detectors. The space-based x-ray imaging system comprises a restraining apparatus configured to restrain the target between the input window and the detector and to cause the target to rotate about an axis and to translate along the axis. The space-based x-ray imaging system comprises a collimator located between the input window and the restraining apparatus, the collimator being configured to shape the x-ray flux.

In yet another variant, the space-based x-ray imaging system is configured as a computerized tomography (CT) system, wherein the detector comprises a flat cone-beam CT detector. The space-based x-ray imaging system comprises a restraining apparatus configured to restrain the target between the input window and the detector and to cause the target to rotate about an axis. The space-based x-ray imaging system comprises a collimator located between the input window and the restraining apparatus, the collimator being configured to shape the x-ray flux.

In a further variant, the space-based x-ray imaging system further comprises a magnet configured to create a magnetic field outside of the spacecraft frame to guide charged particles of the solar radiation toward the input window.

In a variant, the magnet comprises an electromagnet that is selectively configurable to guide the charged particles of the solar radiation toward the input window; and to deflect the charged particles away from the input window.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
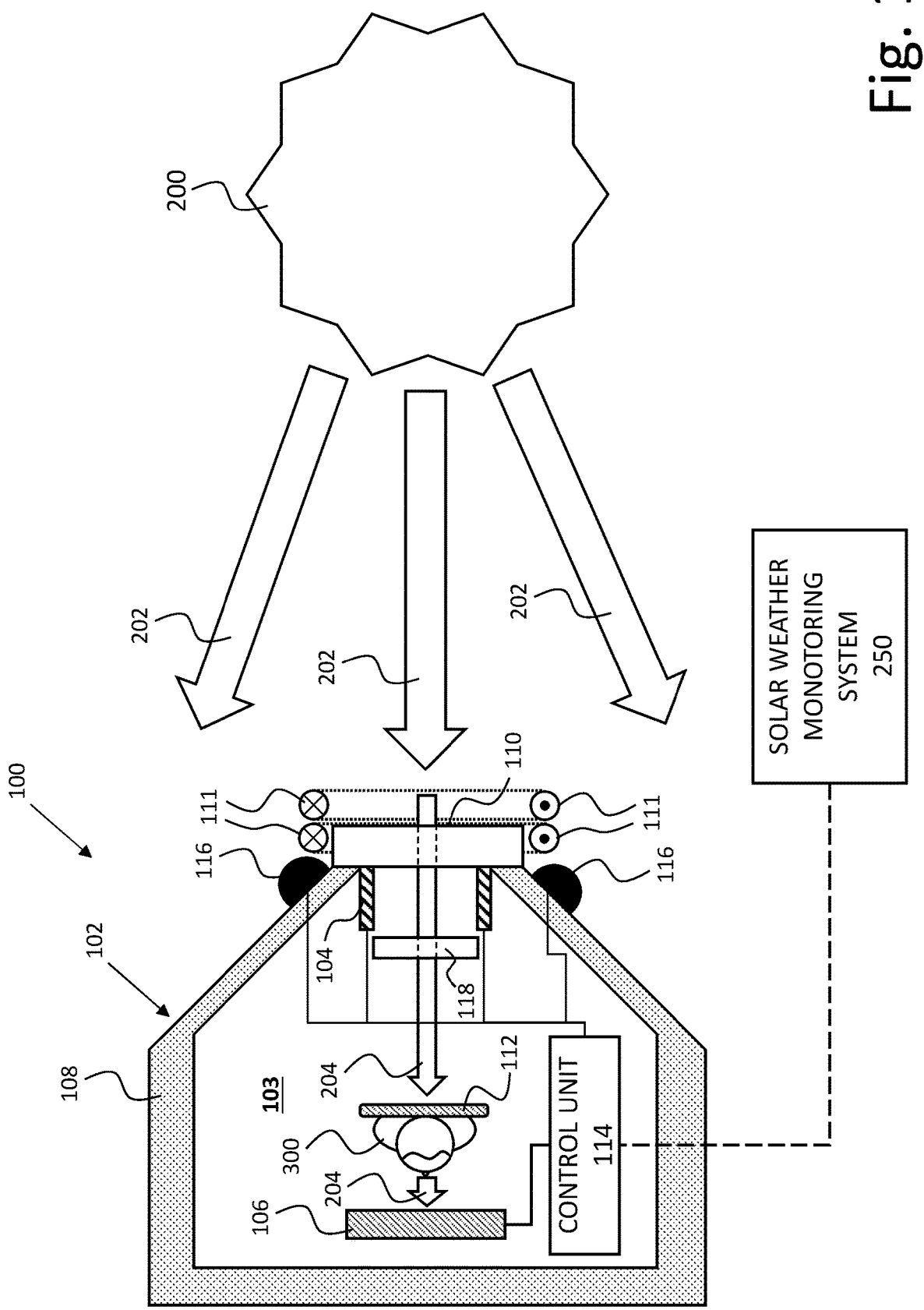
FIG. 1 is a is a top cross-sectional view of a space-based x-ray imaging system, according to some embodiments of the present invention.

FIG. 1 is a is a top cross-sectional view of a space-based x-ray imaging system 100, according to some embodiments of the present invention.

The system 100 includes a spacecraft frame 102, a shutter apparatus 104, and a detector 106.

The spacecraft frame 102 has an inner cavity 103, radiation shielding 108, and an input window 110. The radiation shielding 108 surrounds the inner cavity 102 from all sides except from the window and is designed to shield the inner cavity from space radiation, which may include solar radiation, cosmic rays, and particles trapped in the Earth' magnetic field. The input window 110 opens on a section of the radiation shielding and is configured to enable passage of at least solar radiation therethrough into the inner cavity 103.

The shutter apparatus 104 is disposed near the input window 110, and is configured to be controlled to selectively open and close. In an open mode of the shutter apparatus 104, when the frame 102 is oriented so that the input window 110 faces the Sun 200, passage of solar radiation 202 into the inner cavity 103 via the input window 110 is enabled. In a closed mode of the shutter apparatus 104, passage of the solar radiation into the inner cavity 103 via the input window 103 is blocked. The shutter apparatus is made of radiation shielding material that at absorbs and/or reflects away at least part of the solar radiation away.

The detector 106 is located in the inner cavity 103 and aligned with the input window 110. In this manner, the detector 106 is impinged by the solar radiation passing through the input window 110, such that an x-ray flux 204 from the solar radiation 202 is usable for x-ray imaging of a target 300 located between the detector 106 and the input window 110. The detector is an x-ray detector, and has features designed to enable a desired type of x-ray imaging. As will be discussed further below, the detector 106 may be configured as a computerized tomography (CT) detector for performing CT scans, or a radiography plate (digital or analog) for performing projectional radiography, or a fluorescent screen or flat panel for performing fluoroscopy scans. It should be noted that the above-mentioned examples of x-ray imaging technique are described as non-limiting examples, and the scope of the present invention extends to all types of x-ray imaging techniques.

In some embodiments of the present invention, the system 100 includes a restraining apparatus 112, configured to restrain the target 300 in a desired location between the input window and the detector. As will be discussed further below the restraining apparatus may be fixed or movable depending on the type of x-ray imaging being performed.

In some embodiments of the present invention, the system 100 includes a control unit 114 configured to control the opening and closing of the shutter apparatus 104. The control unit 114 may be used by a technician to open and close the shutter apparatus. In some embodiments of the present invention the system 100 includes one or more sensors 116 configured to measure one or more features of the solar radiation 202 or the x-ray flux 204 (such as kVp and/or mAs, for example), to generate data indicative of the one or more features, and to transmit the data to the control unit 114. The one or more sensors may be outside the spacecraft frame or inside the spacecraft frame.

The control unit 114 is configured to allow opening of the shutter apparatus when the one or more features are within a desired range. When the one or more features are outside the desired range and pose a threat to the people and/or the equipment in the spacecraft frame 102, the control unit 114 closes the shutter apparatus 104 if the shutter apparatus is open, or—if the shutter apparatus 104 is closed—the control unit 114 prevents opening of the shutter apparatus by a user.

In some embodiments, the detector 106 is configured to measure the one or more features of the x-ray flux 204 impinging the detector 106, to generate data indicative of the one or more features, and to transmit the data to the control unit 114. This may be an alternative to the sensors 116, or in addition to the sensors 116.

In some embodiments of the present invention the control unit 114 is configured to communicate with a solar weather monitoring system 250 external to the system 100 (such as GOES-15, for example), and to receive from a solar weather monitoring system 250 solar weather data. The control unit 114 is configured to close the shutter apparatus 104 and prevent the opening of the shutter apparatus 104 by a user when the solar weather data indicates an undesirable condition in the solar weather, such as a solar flare or when solar radiation is stronger than desired. This may be an alternative to in conjunction with the sensors 116 and/or the detector 106.

Generally, imaging x-rays are in the 80-140 keV regime, preferably (but not limited to) in the 120 keV regime. Only a fraction of the solar radiation 202 is in that regime, and even then features (kVp and mAs) of the x-ray flux may fluctuate, which may cause the imaging process to be longer than it would be on Earth, where equipment is available to produce a collimated and steady x-ray beam optimized to have desired features.

In some embodiments of the present invention, the system 100 includes a Bremsstrahlung cascade apparatus 118, which configured to interact with the SEPs of the solar radiation 202 (i.e., to interact with a portion the solar radiation having an energy higher than a desired imaging regime) and to convert the SEPs into imaging photons in the desired imaging regime. In this manner, a steadier x-ray flux 204 can be achieved.

In a variant, the Bremsstrahlung cascade apparatus 118 includes a metal plate covering at least part of the input window 110. The metal plate is configured to decelerate the SEPs. The deceleration of the SEPs causes emission of radiation in the imaging to generate the imaging photons in the desired imaging regime. It should be noted that the plate may be located outside the input window 110, inside the inner cavity 103, or may be integral with the input window 110.

SEPs often have a charge, and thus may and can be guided by magnetic fields. Therefore, a magnetic field could be utilized to guide SEPs toward the input window 110. In some embodiments of the present invention, a magnet or electromagnet 111 may be placed outside the input window 110 for this purpose. For example, the electromagnet 111 may be in the form of a simple Helmholtz coil type electromagnet encircling the input window 100 to guide SEPs to the detector, leading to increased efficiency of imaging x-ray generation through solar energy capture. Other magnet configurations achieving the same uniform central magnetic field aligned with the window could be used instead of a simple Helmholtz configuration.

It is important to note that just as the magnetic field generated by the electromagnet 111 may be utilized to guide charged particles toward the input window 110, the magnetic field may also be aligned so as to deflect particles away from the input window 110, away from the spacecraft frame 102, or, possibly to other portions of the spacecraft frame 102 that are designed to attenuate SEPs safely, protecting the occupants from the potential damaging effects of ionizing radiation. Thus, the magnetic field can be utilized as a method to protect the spacecraft frame 102 and occupants from dangerous solar particle "storms" related to coronal mass ejection or other solar/interstellar particle "storms."

By selecting desired parameters of the plate (material of the plate, thickness of the plate, and distance between the plate and the detector 116), the production of x-rays in the imaging regime from SEPs can be enhanced. In some embodiments of the present invention. In some embodiments of the present invention, the plate includes copper. It should be noted that the selection of specific parameters of the plate is well within the skills of a person skilled in the art and within the scope of the present patent application.

The Bremsstrahlung cascade apparatus 118 may include other forms, as will be discussed further below, with reference to FIGS. 7-11.

The input window 110 may have any desired shape. In some embodiments, of the present invention, the input window 110 may have a rectangular or square frontal cross section, so that the surface facing outward and the surface facing inward have rectangular or square cross-sections as viewed from the inner cavity 103.

Figure 2:
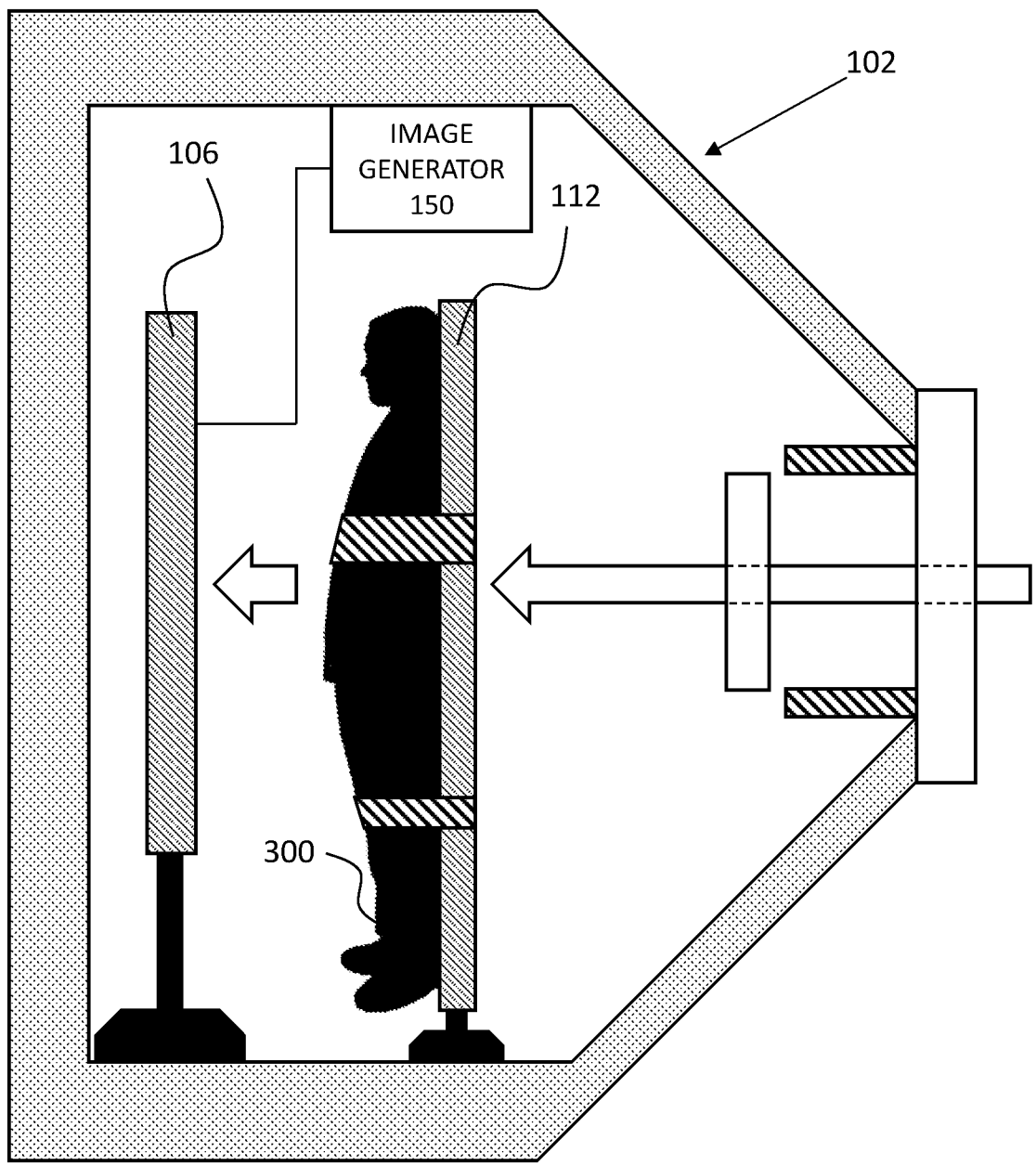
FIG. 2 is a side cross-sectional view of a space-based x-ray imaging system configured for projectional radiography or fluoroscopy, according to some embodiments of the present invention.

FIG. 2 is a side cross-sectional view of a space-based x-ray imaging system 100 configured for projectional radiography or fluoroscopy, according to some embodiments of the present invention.

Before the start of the procedure, the spacecraft frame 102 is oriented so that the input window 110 faces the Sun. In some embodiments of the present invention, the restraining apparatus 112 and/or the detector 106 may be translatable before the projectional radiography or fluoroscopy scan is performed so that a certain portion of the body of the target 300 can be targeted for the scan. The translation may be perpendicular to and/or parallel t the axis of propagation of the x-ray flux. Once the desired portion of the body is targeted, the restraining apparatus 112 and/or the detector 106 are locked in place, so they cannot move for the duration of the procedure. In some embodiments of the present invention, both the restraining apparatus 112 and the detector 106 are fixed and not movable.

The detector 106 may be a digital radiography plate connected to an image generator unit 150. The digital radiography plate is impinged by the x-ray flux (which may be natural x-ray flux from the Sun, or may include the flux generated by the Bremsstrahlung cascade apparatus), and detects the incident flux of x-ray energies impinging different locations of the digital radiography plate. The incident flux of x-ray energies depends on the thickness and type of tissue of the target 300 located between the input window 110 and the detector 106. The image generator 150 receives data indicative of the incident flux of x-ray energies at the different locations and generates an image of the target 300.

If restraining apparatus 112 extends between the input window 110 and the detector 106, the restraining apparatus 112 is made of a material that is fully or mostly transparent to x-rays. Shielding material may be placed on portions of the target 300 and/or the restraining apparatus 112 to prevent or weaken x-ray exposure to parts of the target's body that are not of interest in the scan.

Figure 3:
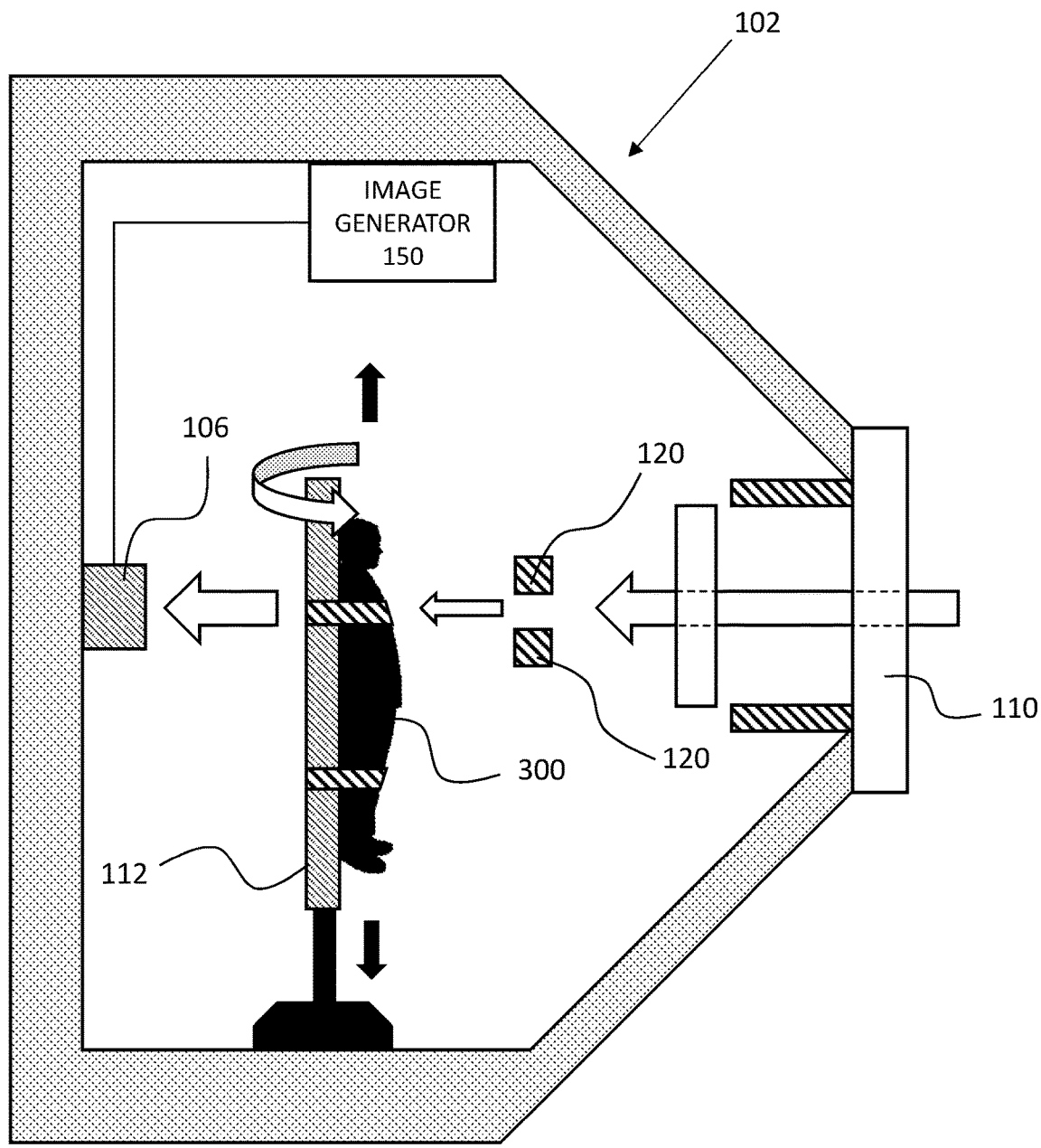
FIGS. 3-5 are side cross-sectional views of a space-based x-ray imaging system having a rotatable and translatable restraining apparatus and configured for computerized tomography, according to some embodiments of the present invention.
Figure 4:
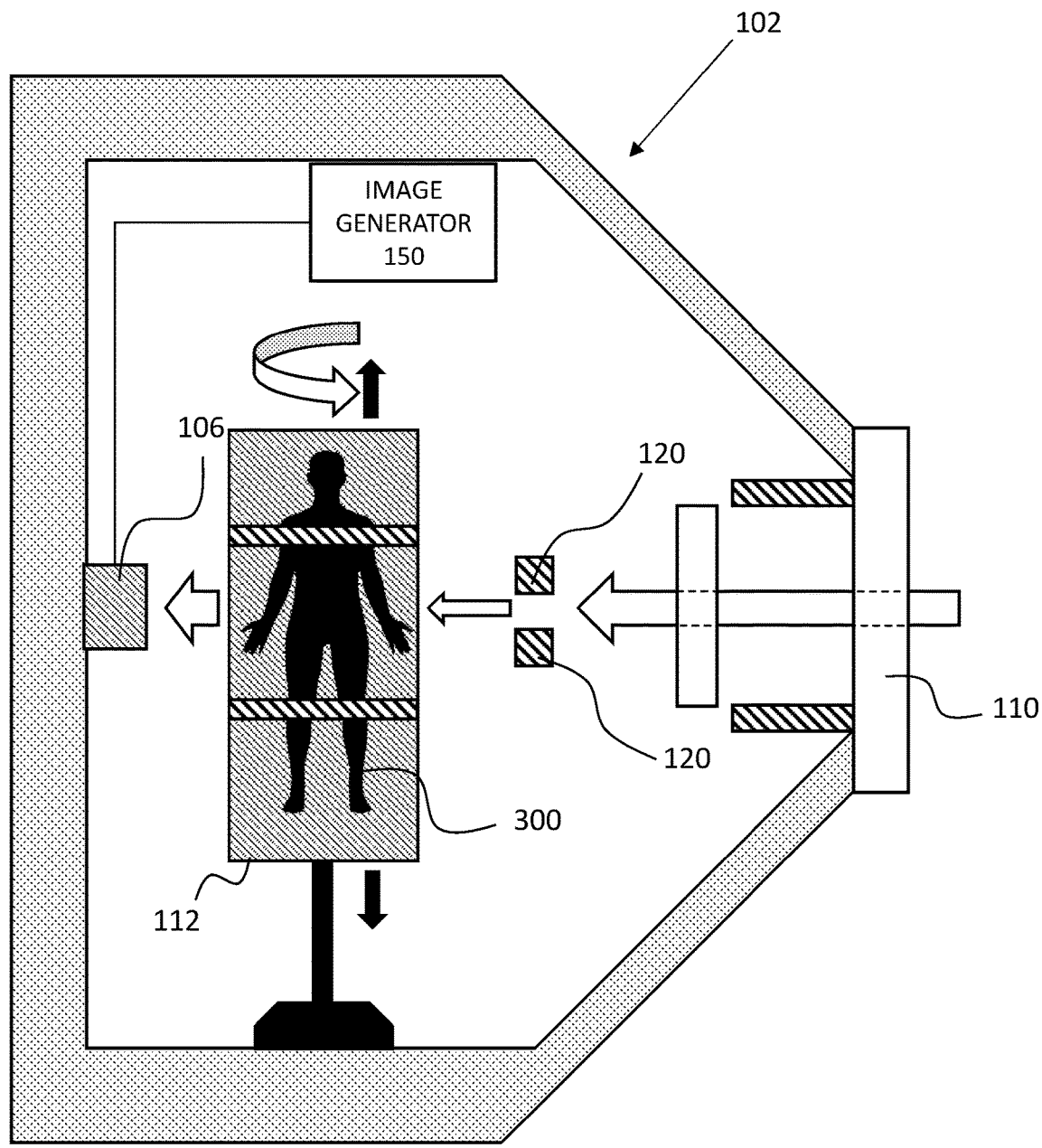
Figure 5:
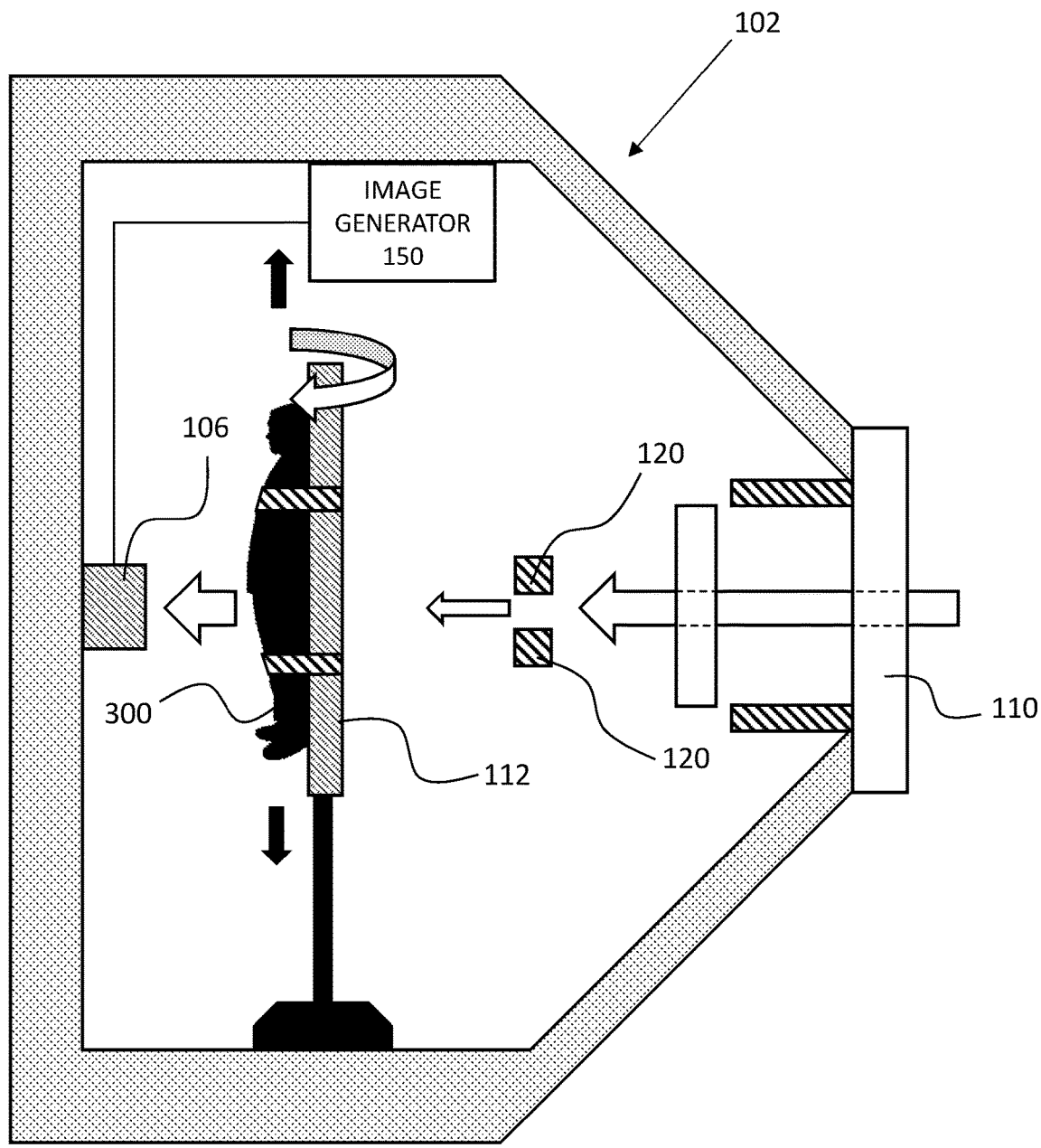

FIGS. 3-5 are side cross-sectional views of a space-based x-ray imaging system 100 having a rotatable and translatable restraining apparatus and configured for computerized tomography, according to some embodiments of the present invention.

In the example of FIGS. 3-5, the detector 106 is located in on a location where the x-ray flux is strongest once the spacecraft frame is oriented so that the input window 110 faces the Sun. The restraining apparatus 112 may be translated before the scan, to reach a desired initial position, and is then locked to prevent translation parallel to the axis of propagation of the x-ray flux. During the scan, the retraining apparatus is rotated about an axis of rotation that is perpendicular to the axis of propagation of the x-ray flux and translated along the axis of rotation. In general, the greater the x-ray flux in the desired range (80-140 keV, for example, 120 keV) and the larger the cross section of the imaging beam, the greater the imaging speed achieved through any given volume through a combination of rotation and translation of the volume containing the object of interest through the beam path. The speed of rotation and translation depend on the features of the x-ray flux. In this manner, a three-dimensional image of the target is generated which can be reconstructed in axial "slices" typical of computed tomographic imaging.

The detector 106 is a CT detector connected to an image generator 150, which is configured to receive data from the detector and generate images of slices, as known in the art. The image generator may also be configured to combine the slices to construct a three-dimensional image of the target.

For conventional CT imaging, the characteristics of the x-ray beam may change in terms of collimation, and the detector would be configured accordingly. For CT imaging, a slice selective narrow fan-beam of 120 keV photons is shaped using collimators 120. Collimators 120 (for example, lead plates) are disposed between the restraining apparatus 112 and the Bremsstrahlung cascade apparatus 118 and/or the window 110, and are used to shape the beam as needed. Using the attenuation data obtained from the exposure and the appropriate reconstruction algorithm, volumetric medical imaging data are obtained and can be post-processed and presented in a variety of imaging planes to aid in medical diagnosis.

In FIG. 3, the scan is initiated, and the restraining apparatus 112 is at its "lowest", so the upper chest of the target 300 is aligned with the detector 106 along the axis of propagation of the x-ray flux. In FIG. 4, the restraining apparatus 112 has rotated a few times and translated "upward", so the stomach of the target 300 is aligned with the detector 106 along the axis of propagation of the x-ray flux. In FIG. 5, the restraining apparatus 112 has rotated a few times and translated "upward", so the pelvis of the target 300 is aligned with the detector 106 along the axis of propagation of the x-ray flux.

Figure 6:
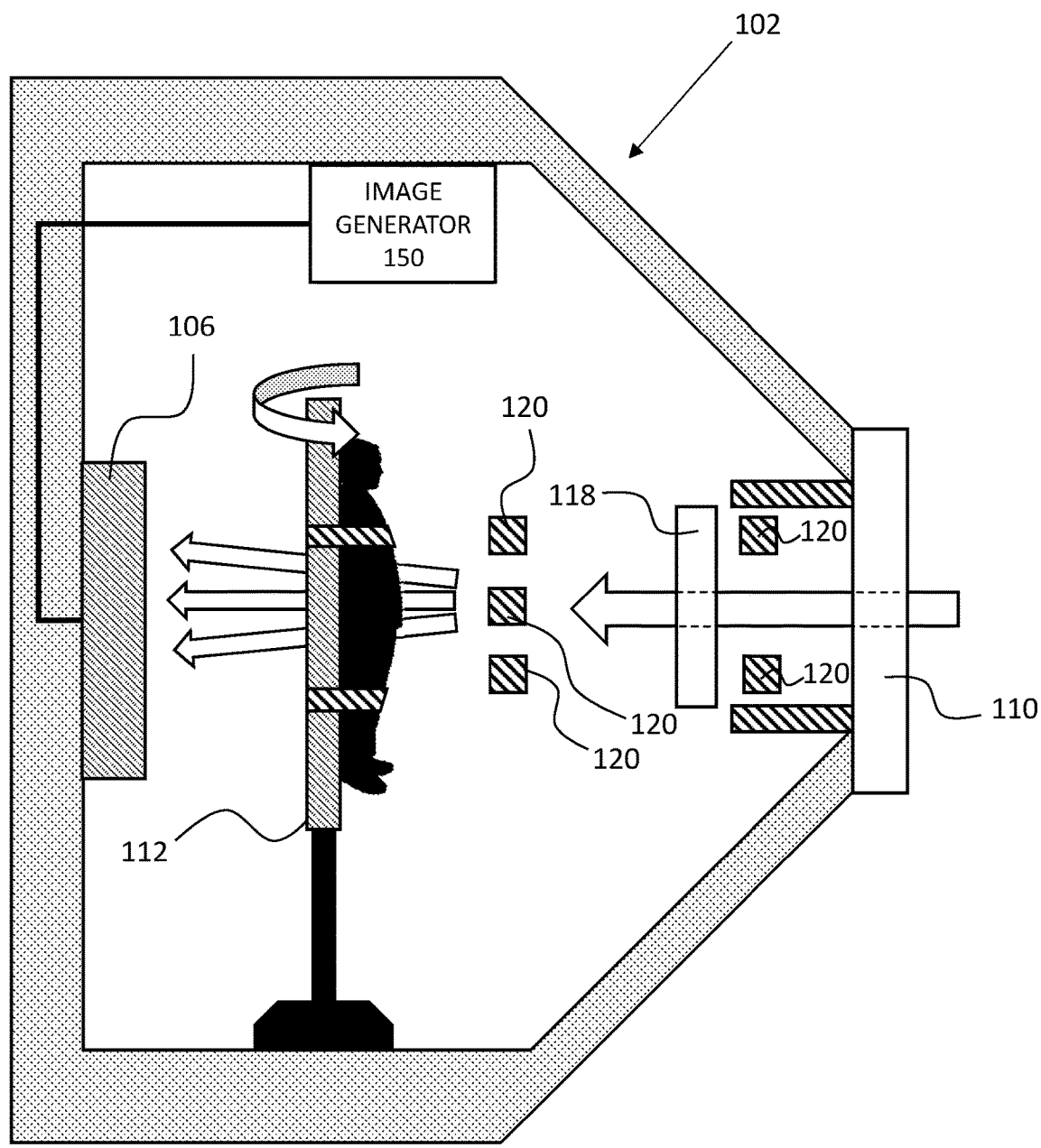
FIG. 6 is a side cross-sectional views of a space-based x-ray imaging system having a rotatable restraining apparatus and a cone-beam detector and configured for computerized tomography, according to some embodiments of the present invention.

FIG. 6 is a side cross-sectional views of a space-based x-ray imaging system 100 having a rotatable restraining apparatus and a cone-beam detector and configured for computerized tomography, according to some embodiments of the present invention.

The system 100 of FIG. 6 is similar to the system of FIGS. 3-5. The difference lies in the fact that in FIG. 6, the detector 106 is a cone beam detector and the image generator 150 is configured to reconstruct an image from data from the cone beam detector. Because the system 100 of FIG. 6 utilize cone-beam technology, the restraint apparatus 112 only rotates during the scan, but does not translate.

For Cone Beam CT imaging, the characteristics of the x-ray beam may change in terms of collimation, and the detector would be configured accordingly. Therefore, collimators 120 (for example, lead plates) are disposed between the restraining apparatus 112 and the Bremsstrahlung cascade apparatus 118 and/or the input window 110, which are used to shape the beam as needed. For Cone Beam CT imaging, a volume selecting, cone-shaped beam of photons is shaped with collimators. Using the attenuation data obtained from the exposure and the appropriate reconstruction algorithm volumetric medical imaging data are obtained and can be post-processed and presented in a variety of imaging planes to aid in medical diagnosis.

Figure 7:
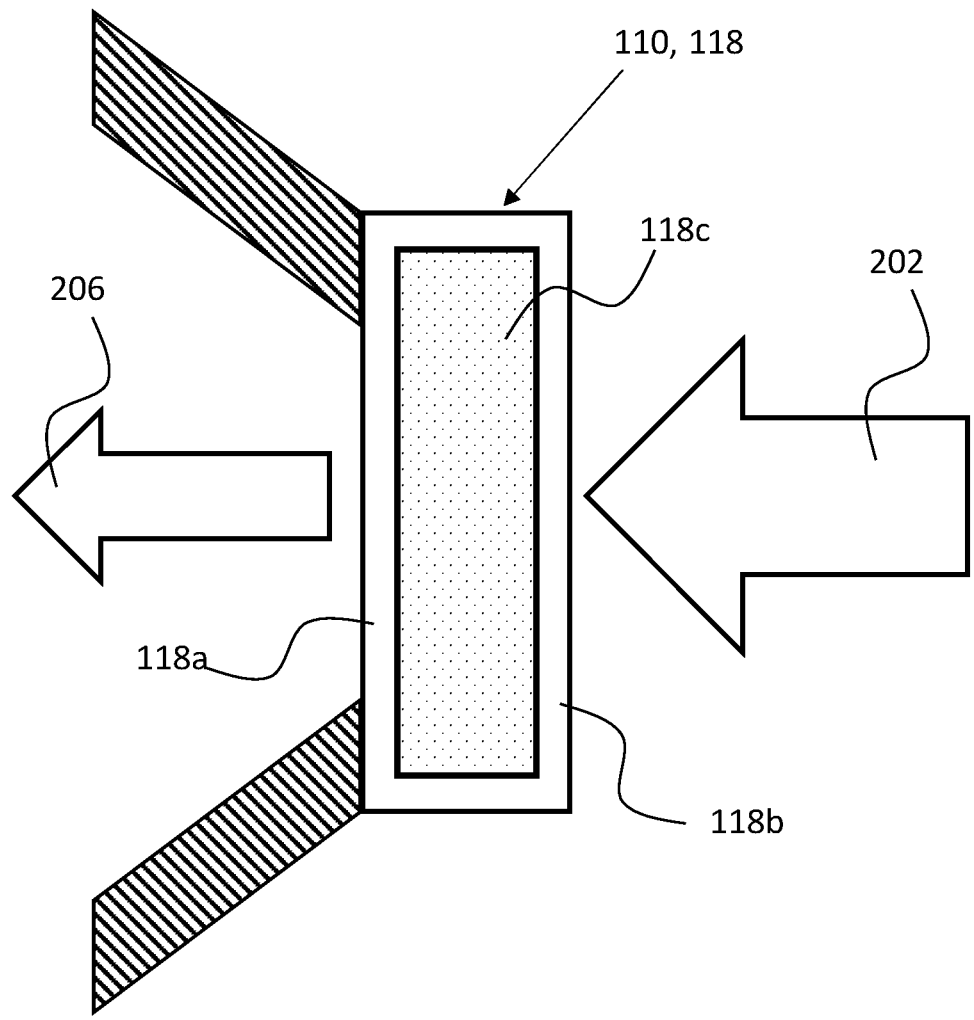
FIG. 7 is a side cross section of a Bremsstrahlung cascade apparatus in the form of a transparent window having two separate panes and at least one noble gas between the panes, according to some embodiments of the present invention.

FIG. 7 is a side cross section of a Bremsstrahlung cascade apparatus 118 in the form of a transparent window having two separate panes 118*a* and 118*b* and at least one noble gas in the hollow space 118*c* between the panes, according to some embodiments of the present invention.

In some embodiments of the present invention, the Bremsstrahlung cascade apparatus 118 includes a transparent window having an inner pane 118*a* facing the detector, an outer pane 118*b* facing the Sun, and a hollow space 118*c* between the inner pane 118*a* and the outer pane 118*b*. The hollow space 118*c* is filled with a desired noble gas at a desired pressure, such that the noble gas is configured to interact with a portion of the SEPs in the solar radiation 202 passing therethrough, to generate a secondary x-ray flux 206 of photons in the desired imaging regime. The secondary x-ray flux 206 may be steadier than the x-ray flux naturally produced by the Sun.

In one variant of the present invention, this type of Bremsstrahlung cascade apparatus 118 is integral with the input window 110. In another variant this type of Bremsstrahlung cascade apparatus 118 is separate from the input window 110 and placed in the vicinity of the input window 110.

Figure 8:
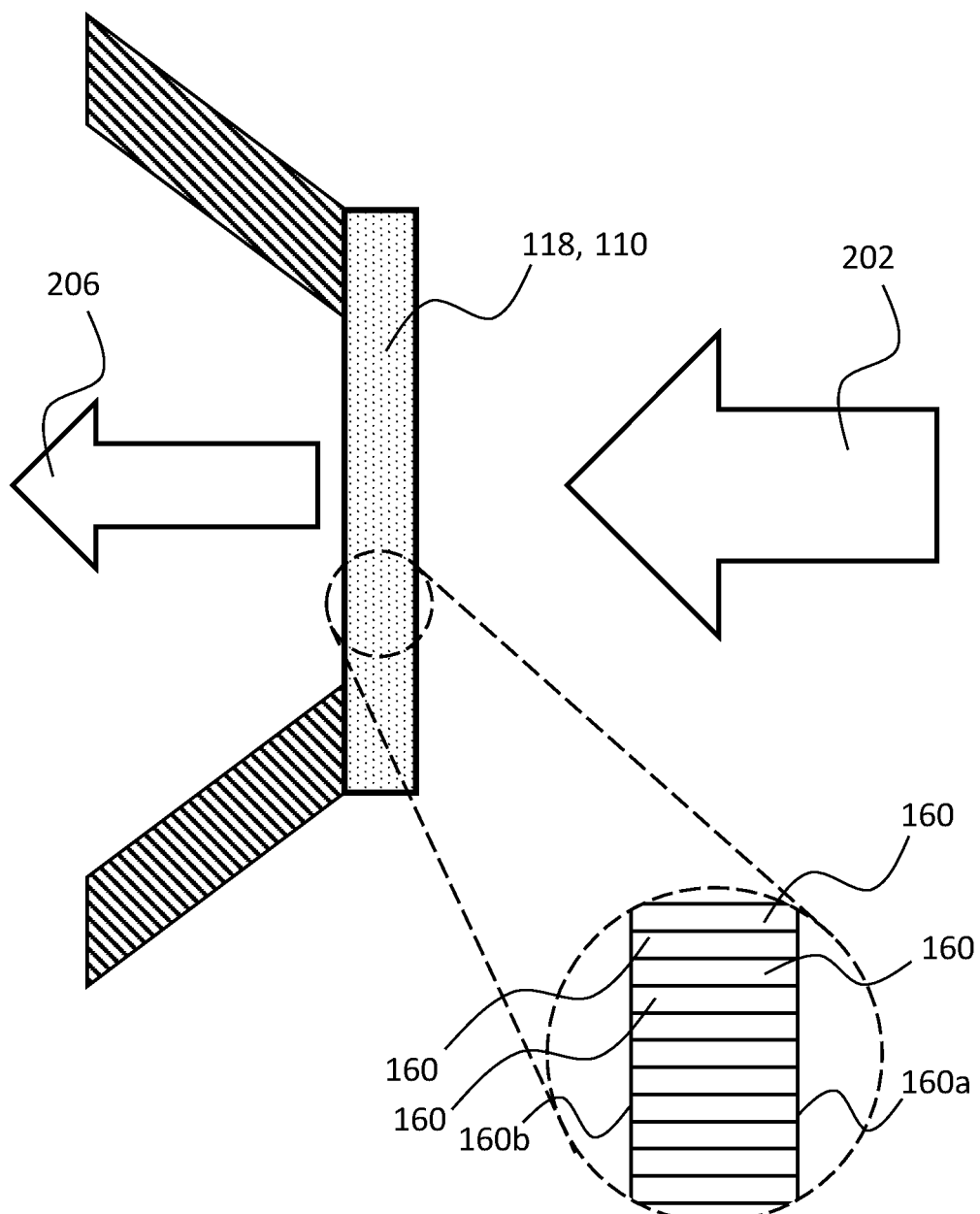
FIG. 8 is a side cross section of a Bremsstrahlung cascade apparatus formed by a plurality of polycapillary tubes, according to some embodiments of the present invention.
Figure 9:
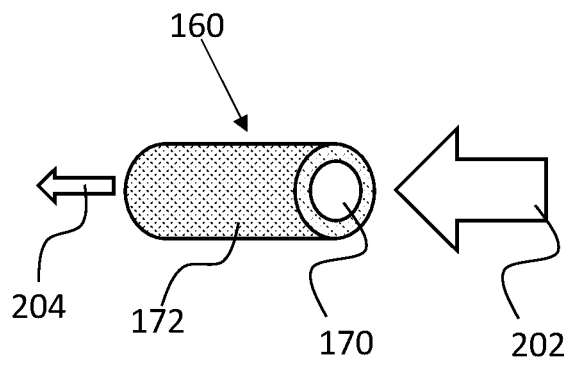
FIG. 9 illustrates a single polycapillary tube, according to some embodiments of the present invention.

FIG. 8 is a side cross section of a Bremsstrahlung cascade apparatus 118 formed by a plurality of polycapillary tubes 160, according to some embodiments of the present invention. FIG. 9 illustrates a single polycapillary tube 160, according to some embodiments of the present invention.

In the example of FIG. 8, the Bremsstrahlung cascade apparatus 118 comprises a plurality polycapillary tubes 160. Each polycapillary tube has a first end 160*a* facing outward from the spacecraft frame and a second end 160*b* facing the inner cavity. Each polycapillary tube has a diameter of an order of magnitude of one or more wavelengths corresponding to one or more predetermined types of radiation (SEPs) in the solar radiation 202. In this manner, each polycapillary tube 160 only receives the predetermined types of radiation and filters out (reflects) radiation with a wavelength different than the predetermined one of more wavelengths. At least one of the polycapillary tubes 160 includes atoms and/or molecules configured to interact with the radiation traversing the tube to generate a secondary x-ray 206 flux of imaging photons in the desired imaging regime exiting the second end 160*b* of the tube and traveling toward the detector. As noted above, the secondary x-ray flux 206 may be steadier than the natural x-ray flux produced by the Sun. Each polycapillary tube 160 includes a core 170 radially surrounded by a cladding sheath 172. The core 170 is transparent to the one or more predetermined types of solar radiation that are received by the tube 160. The core 170 may be made of glass, Uranium-doped glass, for example. The Uranium glass in appropriate concentration lets naturally occurring hard x-rays to pass, and interacts with SEPs through various attenuation interactions (e.g., Bremsstrahlung) to generate lower energy photons that are useful for imaging. The cladding sheath is designed to facilitate attenuation and/or total-internal-reflection of these secondarily-generated SEP photons based on their direction of travel and energy. The geometric configuration of the apparatus is designed to create a coherent beam of 120 keV photons for diagnostic medical imaging. The cladding sheath 172 may be made of metal-doped glass (such as Lead-doped glass, for example), for example, or may be made of a thin film metal, such as metallic lead which could be vapor deposited in a thin film surrounding the core 170.

In some embodiments of the present invention, the Bremsstrahlung cascade apparatus 118 of FIG. 8 is integral with the input window 110. In some embodiments of the present invention, the Bremsstrahlung cascade apparatus 118 of FIG. 8 is separate from the input window 110 and may located between the input window 110 and the detector 106, or, may be mounted to the exterior of the spaceframe 102, placed between the sun and the input window 110.

Figure 10:
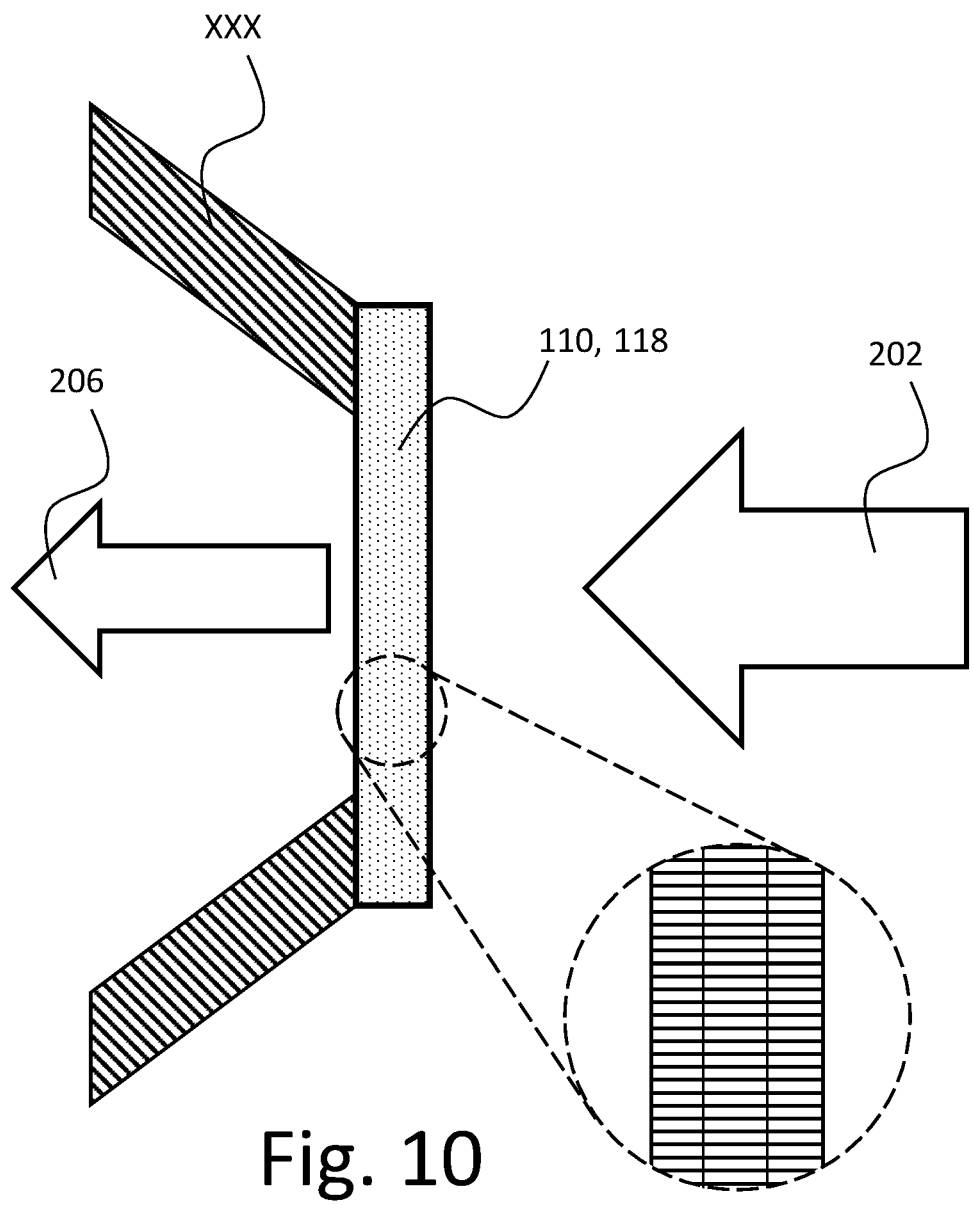
FIG. 10 is a side cross section of a Bremsstrahlung cascade apparatus formed by a plurality of series of polycapillary tube segments, according to some embodiments of the present invention.
Figure 11:
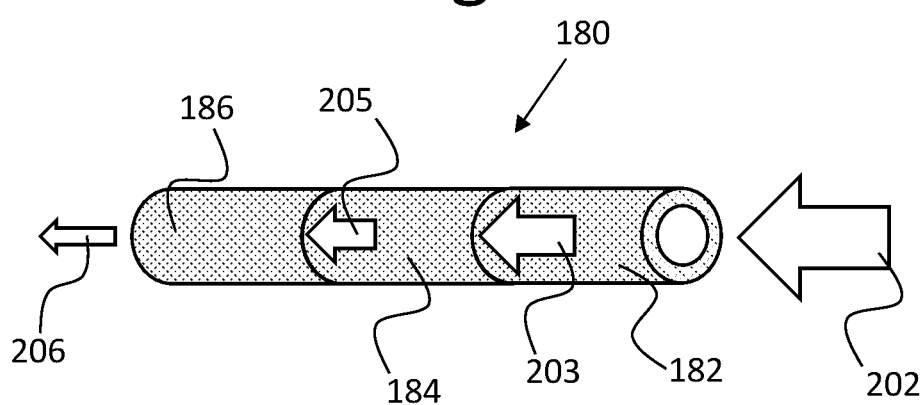
FIG. 11 illustrates a single series of polycapillary tube segments, according to some embodiments of the present invention.

FIG. 10 is a side cross section of a Bremsstrahlung cascade apparatus 118 formed by a plurality of series 180 of polycapillary tube segments 182, according to some embodiments of the present invention. FIG. 11 illustrates a single series 180 of polycapillary tube segments 182, according to some embodiments of the present invention.

The Bremsstrahlung cascade apparatus 118 of FIG. 10 is similar to the Bremsstrahlung cascade apparatus 118 of FIG. 8. The difference lies in the fact that the single polycapillary tubes 160 of FIG. 8 are replaced by series 180 of polycapillary tube segments (182, 184, 186) disposed serially one after the other.

Each one of the segments (184, 186) is configured to receive radiation output from a preceding segment (182, 184) and to partially attenuate the received radiation via interaction therewith. In this manner, the first (outermost) segment 182 in the series 180 receives SEPs from the solar radiation 202, and the last segment 186 in the series 180 is configured to output a secondary flux radiation 206 in the desired imaging range.

In FIG. 11, a single series is shown, having three segments, each having a core and a metallic sheath, as explained above with reference to FIG. 9. The first segment 182 is configured to receive a radiation within a first predetermined wavelength range from the solar radiation 202. The first segment includes first atoms and/or first molecules to provide a first attenuation and to output first output radiation 203. The second segment 184 may have a larger core configured to receive at least a portion of the first output radiation 203. The second segment 184 includes second atoms and/or second molecules to provide a second attenuation and to output second output radiation 205. The third (and last) segment 186 may have core larger than the core of the second segment 184 and configured to receive at least a portion of the second output radiation 205. The third segment 186 includes third atoms and/or third molecules to provide a third attenuation and to output the secondary x-ray flux 206.

The example of FIG. 10 shows a series 180 made of three segments. However, any number of segments may be chosen by a person skilled in the art, to achieve a desired attenuation. Moreover, the scope of the present invention extends to the embodiment in which a portion of the Bremsstrahlung cascade apparatus 118 includes series 180 and a portion of the Bremsstrahlung cascade apparatus 118 includes single polycapillary tubes 160 (as shown in FIG. 8).

Figure 12:
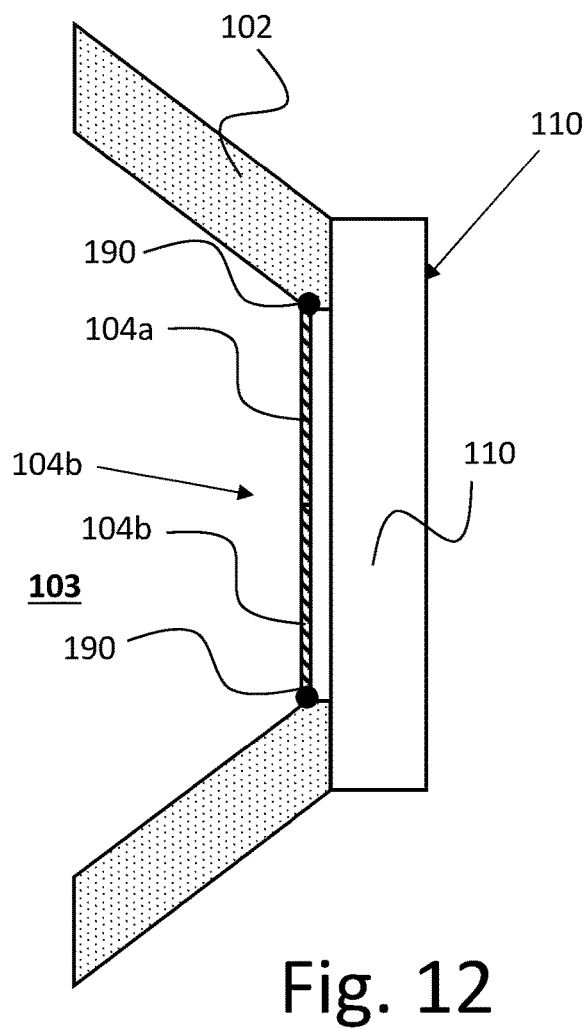
FIGS. 12 and 13 illustrate a door-like shutter apparatus, according to some embodiments of the present invention.
Figure 13:
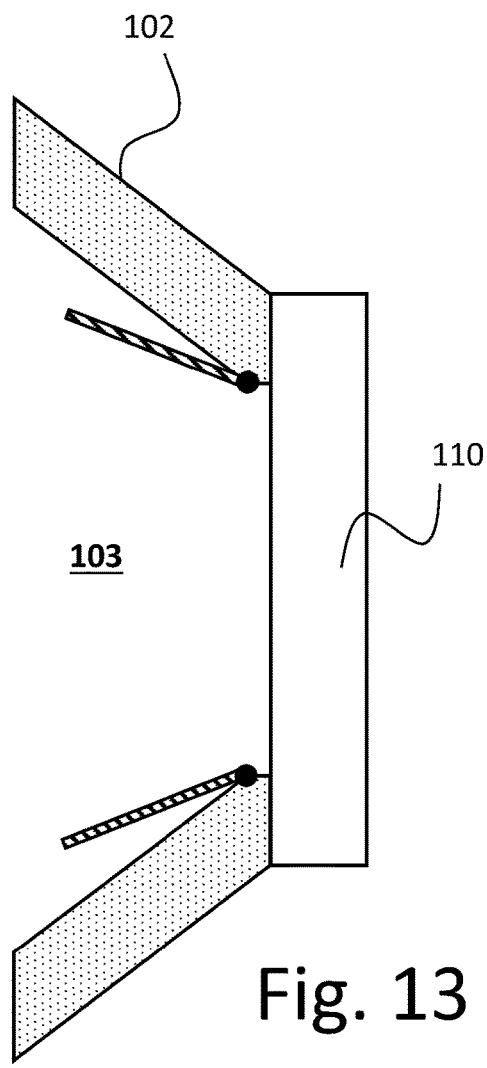

FIGS. 12 and 13 illustrate a door-like shutter apparatus 104, according to some embodiments of the present invention. In FIG. 12, the shutter apparatus 104 is closed. In FIG. 13, the shutter apparatus 104 is open.

In the example of FIGS. 12 and 13, the shutter apparatus includes two door panels 104a and 104b hinged to the spacecraft frame 102 inside the inner cavity 103. Each door panel (104a, 104b) is configured to rotate about its respective hinge (190, 192) to open and closed, as desired.

In some embodiments of the present invention, as single door panel may be included to cover the whole input window 110. In some embodiments, of the present invention, the shutter 104 apparatus may be outside the spacecraft frame 102 and be in the form of a dome or door hinged to the outside of the spacecraft frame 102, configured to selectively cover and uncover the input window 100.

Figure 14:
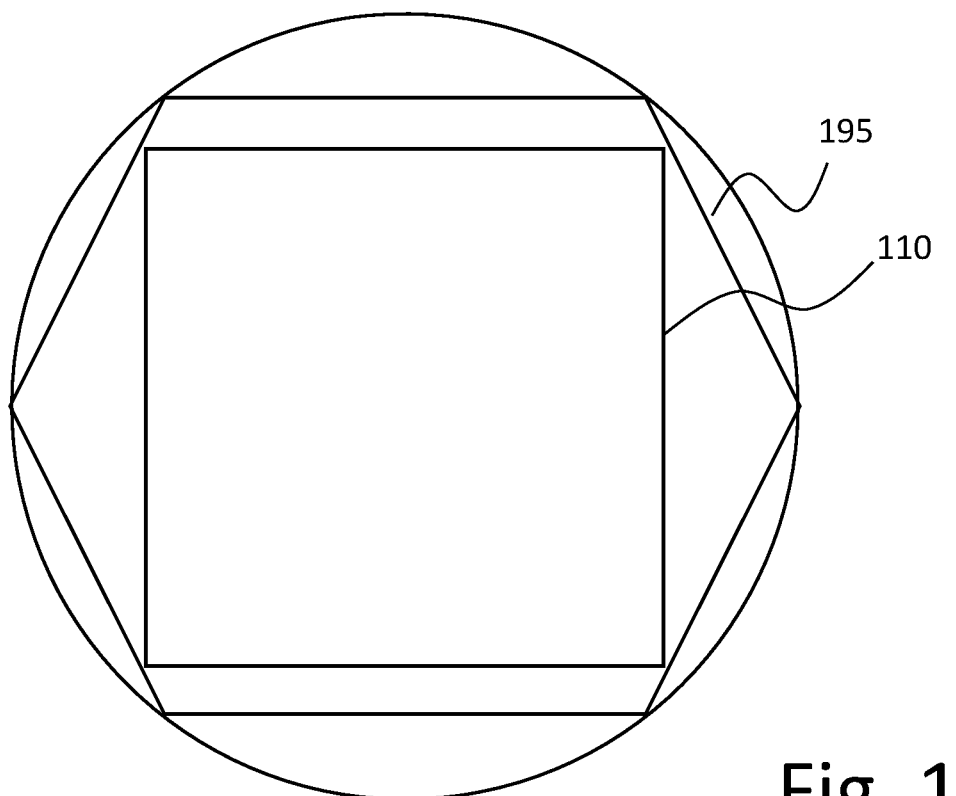
FIGS. 14-16 illustrate and iris-shaped shutter apparatus, configured control a cross section through which the solar radiation passes into the inner cavity.
Figure 15:
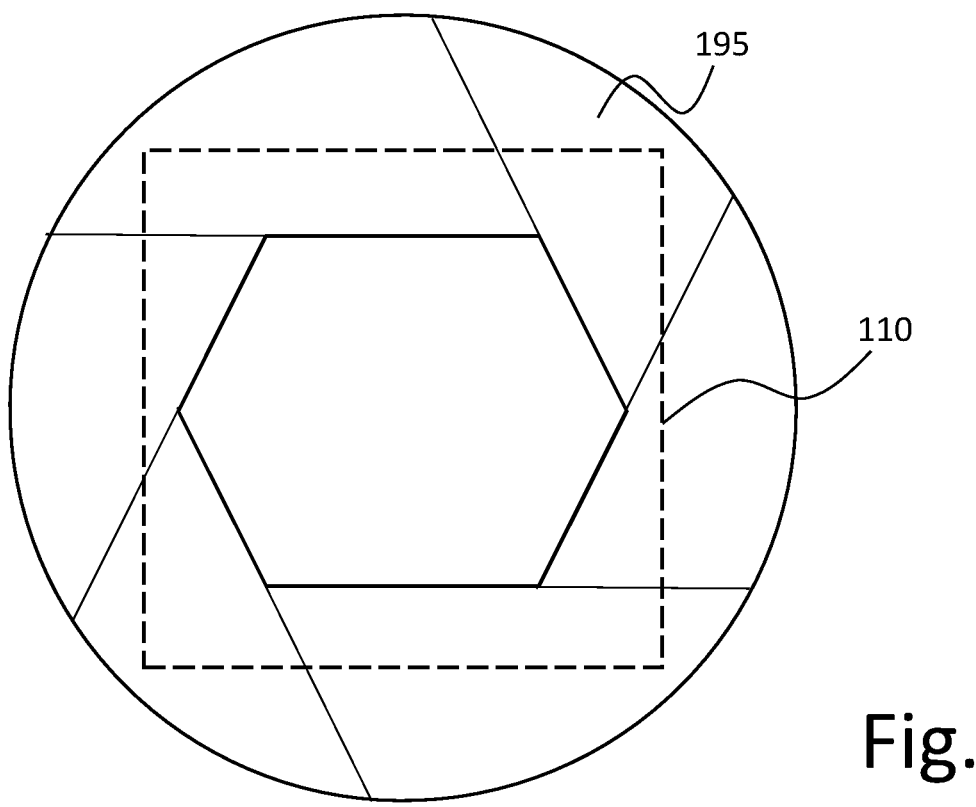
Figure 16:
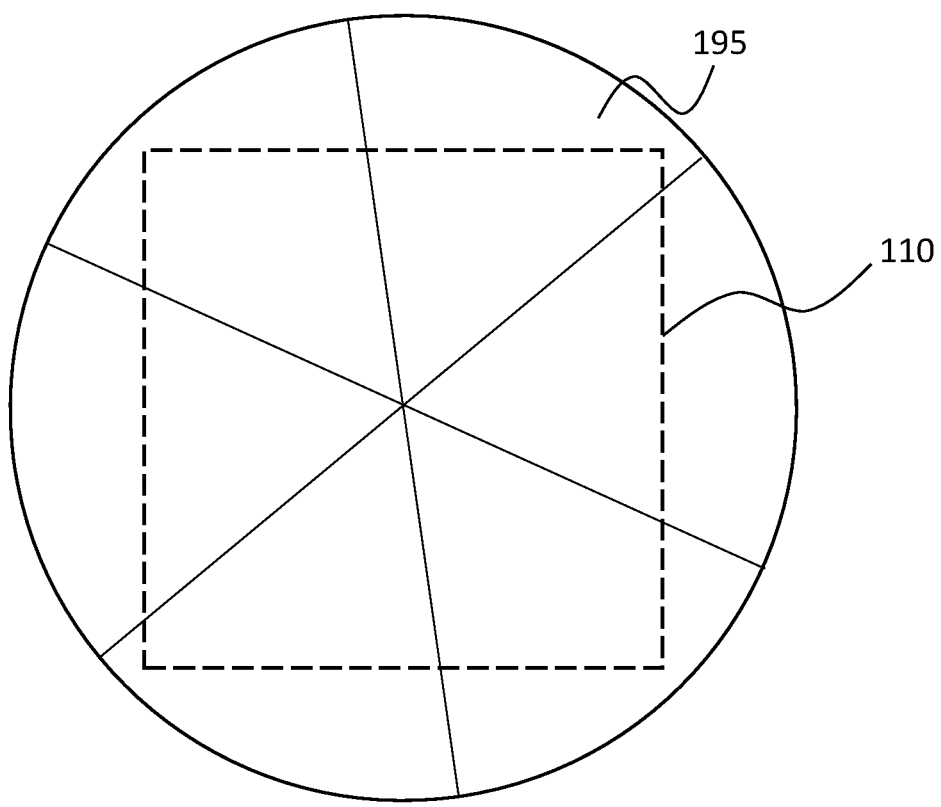

FIGS. 14-16 illustrate a frontal view of the and iris-shaped shutter apparatus 104 as viewed from the inner cavity of the spacecraft frame, iris-shaped shutter apparatus 104 configured control a cross section through which the solar radiation passes into the inner cavity.

The iris-shaped shutter apparatus includes a plurality of curved blades 195. As these blades are pushed inward they overlap to decrease the cross section through which the solar radiation passes into the inner cavity.

In FIG. 14, the blades 195 are pulled out, so the full input window 110 is open. In FIG. 15, the blades 195 are pushed inwards toward other, to close a portion of input window 110. In FIG. 16, the blades 195 are pushed inwards toward other, to completely close the input window 110. It should be noted that in some embodiments of the present invention, the control unit 114 controls an operation of the iris-shaped shutter apparats, to control the cross section such that the one or more features of the x-ray flux reaching the detector is within a desired range. In the case of projectional radiography and cone-beam CT imaging, the iris may be square shaped for the planar or volumetric imaging, however, in the case of conventional CT imaging, the iris may be a narrow rectangle, creating a "slice selecting" x-ray flux that is utilized for this type of radiographic imaging technique. For example, in the case of projectional radiography and cone beam CT, a large area of opening would be desired, whereas, for conventional CT imaging, a narrow "slice-selecting" beam would be optimal and the shutters could be disposed in this manner.

It should noted that though the imaging system of the present invention is described in relation to diagnostic medical x-ray imaging, the system of the present invention may be used for engineering x-ray inspection of structures, such as metallic turbines, manifolds, or metal structures in general. Thus, the target 300 may be any target that can imaged via x-ray imaging.

It should be noted that the magnetic or electromagnetic guide 111 of the Bremsstrahlung Cascade Window can be utilized independently as a deflector, as well. Thus, the magnet or electromagnet can be aligned in a different position (opposite alignment from the imaging-guide position) as a light-weight method to add SEP shielding, protecting the spacecraft and occupants from harmful ionizing radiation, deflecting charged particles away from the spacecraft.

What is claimed is:

1. A space-based x-ray imaging system comprising:
   (i) a spacecraft frame having an inner cavity and comprising:
      (i)(1) radiation shielding for shielding the inner cavity from solar radiation;
      (i)(2) an input window opening on a section of the radiation shielding and configured to enable passage of the solar radiation therethrough into the inner cavity;
   (ii) a shutter apparatus disposed near the input window, the shutter apparatus being configured to be controlled to selectively open and close, such that in an open mode of the shutter apparatus, passage of the solar radiation into the inner cavity via the input window is enabled, and in a closed mode of the shutter apparatus, passage of the solar radiation into the inner cavity via the input window is blocked;
   (iii) a detector located in the inner cavity and aligned with the input window, such that the detector is impinged by the solar radiation passing through the input window, such that an x-ray flux from the solar radiation is usable for x-ray imaging of a target located between the detector and the input window.

2. The space-based x-ray imaging system of claim 1, further comprising a Bremsstrahlung cascade apparatus configured to interact with a portion of the solar radiation having an energy higher than a desired imaging regime and to convert the portion of the solar radiation into imaging photons in the desired imaging regime.

3. The space-based x-ray imaging system of claim 2, wherein the desired imaging regime is 80-140 keV.

4. The space-based x-ray imaging system of claim 2, wherein the Bremsstrahlung cascade apparatus comprises a metal plate covering at least part of the input window and configured to decelerate the portion of the solar radiation, to generate the imaging photons in the desired imaging regime.

5. The space-based x-ray imaging system of claim 4, wherein the metal plate comprises a lead plate.

6. The space-based x-ray imaging system of claim 2, wherein the Bremsstrahlung cascade apparatus comprises a transparent window having two separate panes and at least one noble gas between the panes, the at least one noble gas being configured to interact with the portion of the solar radiation passing therethrough, to generate the imaging photons in the desired imaging regime.

7. The space-based x-ray imaging system of claim 6, wherein the Bremsstrahlung cascade apparatus is part of the input window.

8. The space-based x-ray imaging system of claim 2, wherein:
the Bremsstrahlung cascade apparatus comprises a plurality polycapillary tubes having first ends facing outward from the spacecraft frame and second ends facing the cavity, the polycapillary tubes having diameters on an order of magnitude of one or more wavelengths corresponding to one or more predetermined types of radiation in the portion solar radiation, such that the polycapillary tubes only receive the predetermined types of radiation and filter out radiation with a wavelength different than the predetermined one or more wavelengths;
each polycapillary tube comprise a core radially surrounded by a cladding sheath comprising a metal, the core being transparent to the one or more predetermined types of solar radiation;
at least one of the polycapillary tubes comprises one or more atoms or molecules in the respective core, configured to generate the imaging photons in the desired imaging regime via interaction with the one or more predetermined types of radiation.

9. The space-based x-ray imaging system of claim 8, wherein:
at least one of the polycapillary tubes comprises a plurality of segments disposed serially in line;
each one of the segments is configured to receive radiation output from a preceding one of the segments and partially weaken the received radiation via interaction therewith, such that a last one of the segments is configured to generate radiation in the desired imaging range.

10. The space-based x-ray imaging system of claim 8, wherein the Bremsstrahlung cascade apparatus is part of the input window.

11. The space-based x-ray imaging system of claim 1, wherein the shutter apparatus is disposed in the inner cavity.

12. The space-based x-ray imaging system of claim 1, wherein the shutter apparatus is disposed outside the inner cavity.

13. The space-based x-ray imaging system of claim 1, wherein the input window is rectangular.

14. The space-based x-ray imaging system of claim 1, wherein the input window is square.

15. The space-based x-ray imaging system of claim 1, comprising:
a control unit configured to receive data indicative at least one characteristic of the x-ray flux and to control the shutter apparatus, such that the shutter apparatus is in the closed mode when the at least one characteristic is outside a desired range and such that the shutter apparatus is in the open mode when the at least one characteristic is within the desired range.

16. The space-based x-ray imaging system of claim 15, comprising at least one sensor configured to measure the at least one characteristic of the x-ray flux and generate the data indicative at least one characteristic of the x-ray flux;
wherein the at least one sensor is configured to communicate with the control unit and to transmit the data thereto.

17. The space-based x-ray imaging system of claim 15, wherein:
the detector is configured measure the at least one characteristic of the x-ray flux and generate the data indicative at least one characteristic of the x-ray flux;
the detector is configured to communicate with the control unit and to transmit the data thereto.

18. The space-based x-ray imaging system of claim 15, wherein the control unit is configured to communicate with a solar weather monitoring system and to receive from a solar weather monitoring system solar weather data, the control unit being configured to close the shutter apparatus when the solar weather data indicates an undesirable condition in the solar weather.

19. The space-based x-ray imaging system of claim 1, wherein the shutter apparatus comprises an iris, configured to be controlled to selectively open and close and to control a cross section through which the solar radiation passes into the inner cavity.

20. The space-based x-ray imaging system of claim 19, wherein:
the detector is configured to generate data indicative of at least one characteristic of the radiation impinging the detector; and
the space-based x-ray imaging system comprises a control unit configured to receive the data from the detector and to control an operation of the iris, to control the cross section such that the at least one characteristic is within a desired range.

21. The space-based x-ray imaging system of claim 1 configured as a projectional radiography system, wherein the detector comprises a digital radiography plate configured to detect an incident flux of x-ray energies of the x-ray flux and to create a two-dimensional image of the target.

22. The space-based x-ray imaging system of claim 1 configured as a computerized tomography (CT) system, wherein:
the detector comprises one or more CT detector;
the space-based x-ray imaging system comprises a restraining apparatus configured to restrain the target between the input window and the detector and to cause the target to rotate about an axis and to translate along the axis; and
the space-based x-ray imaging system comprises a collimator located between the input window and the restraining apparatus, the collimator being configured to shape the x-ray flux.

23. The space-based x-ray imaging system of claim 1 configured as a computerized tomography (CT) system, wherein:
the detector comprises a flat cone-beam CT detector;
the space-based x-ray imaging system comprises a restraining apparatus configured to restrain the target between the input window and the detector and to cause the target to rotate about an axis; and
the space-based x-ray imaging system comprises a collimator located between the input window and the restraining apparatus, the collimator being configured to shape the x-ray flux.

24. The space-based x-ray imaging system of claim 1, further comprising a magnet configured to create a magnetic field outside of the spacecraft frame to guide charged particles of the solar radiation toward the input window.

25. The space-based x-ray imaging system of claim 1, wherein the magnet comprises an electromagnet that is selectively configurable:
- to guide the charged particles of the solar radiation toward the input window; and
- to deflect the charged particles away from the input window.

\* \* \* \* \*